United States Patent
Marseille et al.

(10) Patent No.: US 8,447,906 B2
(45) Date of Patent: May 21, 2013

(54) DEVICE OF SD® TYPE USING A SINGLE WIRE PROTOCOL

(75) Inventors: Francois-Xavier Marseille, Marly le Roi (FR); Michel Thill, Les Clayes Sous Bois (FR)

(73) Assignee: Gemalto SA, Meudon (FR)

( * ) Notice: Subject to any disclaimer, the term of this patent is extended or adjusted under 35 U.S.C. 154(b) by 115 days.

(21) Appl. No.: 13/061,835

(22) PCT Filed: Aug. 21, 2009

(86) PCT No.: PCT/EP2009/060840
§ 371 (c)(1),
(2), (4) Date: Apr. 20, 2011

(87) PCT Pub. No.: WO2010/026063
PCT Pub. Date: Mar. 11, 2010

(65) Prior Publication Data
US 2011/0270999 A1    Nov. 3, 2011

(30) Foreign Application Priority Data
Sep. 8, 2008  (EP) .................................... 08305536

(51) Int. Cl.
*H05K 7/10* (2006.01)
*G06F 13/14* (2006.01)

(52) U.S. Cl.
USPC ........................................ 710/301; 710/305

(58) Field of Classification Search
USPC ................ 710/300–302, 305–306, 311–315
See application file for complete search history.

(56) References Cited

U.S. PATENT DOCUMENTS

| | | | |
|---|---|---|---|
| 7,757,847 B2* | 7/2010 | Tang et al. ................. | 206/307.1 |
| 2007/0145135 A1 | 6/2007 | Jogand-Coulomb et al. | |
| 2007/0194134 A1* | 8/2007 | Shin et al. ..................... | 235/492 |
| 2008/0006704 A1 | 1/2008 | Kim | |
| 2009/0157928 A1* | 6/2009 | Riegebauer ................... | 710/110 |
| 2010/0009627 A1* | 1/2010 | Huomo ......................... | 455/41.1 |
| 2010/0108772 A1* | 5/2010 | Hartel .......................... | 235/492 |
| 2010/0167641 A1* | 7/2010 | Virtanen ...................... | 455/41.1 |
| 2011/0170456 A1 | 7/2011 | Marseille et al. | |

FOREIGN PATENT DOCUMENTS

| | | |
|---|---|---|
| DE | 102006053787 A1 | 5/2008 |
| EP | 2 139 211 A1 | 12/2009 |

OTHER PUBLICATIONS

SD Card Specification, Simplified Version of: Part E1—Secure Digital Input/Output (SDIO) Card Specification, Version 1.00, Oct. 2001, SD Association.*

Office Action from European Patent Office dated Aug. 13, 2012, issued in corresponding European Patent Application No. 09 811 102.4.

International Search Report (PCT/ISA/210) issued on Oct. 14, 2009, by European Patent Office as the International Searching Authority for International Application No. PCT/EP2009/060840.

(Continued)

*Primary Examiner* — Paul R Myers
*Assistant Examiner* — Trisha Vu
(74) *Attorney, Agent, or Firm* — Buchanan Ingersoll & Rooney PC

(57) ABSTRACT

The invention is a portable electronic device comprising a non volatile memory and a memory controller. The portable electronic device comprises a connector having eight pads able to communicate using a protocol of Secure Digital® type. The connector comprises at least one additional pad intended to be linked to an antenna. The additional pad is able to communicate using a protocol of SWP type.

2 Claims, 2 Drawing Sheets

OTHER PUBLICATIONS

Written Opinion (PCT/ISA/237) issued on Oct. 14, 2009, by European Patent Office as the International Searching Authority for International Application No. PCT/EP2009/060840.

"Smart Cards; UICC-Contactless Front-end (CLF) Interface; Part 1: Physical and data link layer characteristics (Release 7); ETSI TS 102 613"; 2008.

* cited by examiner

DEVICE OF SD® TYPE USING A SINGLE WIRE PROTOCOL

FIELD OF THE INVENTION

The present invention relates to devices of Secure Digital® type. It relates particularly to way of extending communication capability of a SD® device.

PRIOR ART

Memory cards like SD® (also named Secure Digital®) card comprise a memory with a size that may reach up to several Gigabytes. SD® cards have a connector allowing communication exchanges with external machines through the Secure Digital® protocol. Such a connector has basically eight pads dedicated to the Secure Digital® protocol.

A new release of the SD® standard offers the possibility to have two additional pads dedicated to an antenna. Thus a SD® connector may have up to ten pads where the two additional pads are intended to provide RF communication. A problem is to extend the SD® device communication capabilities with a minimum impact on the available pads.

SUMMARY OF THE INVENTION

An object of the invention is to solve the above mentioned technical problem. The invention provides a solution for using only a small part of the connector in order to extend the SD® device capabilities.

The object of the present invention is a portable electronic device intended to be connected to a host machine. The portable electronic device comprises a non volatile memory and a memory controller. The portable electronic device comprises a connector which comprises eight pads capable of communicating using a protocol of Secure Digital® type. The connector comprises at least a first additional pad intended to be used for a radio frequency communication. The first additional pad is capable of communicating using a protocol of SWP type. The portable electronic device comprises a means capable of managing a communication session according to a protocol of SWP type.

Advantageously, the connector may be a MicroSD® connector.

Alternatively the connector may be a MicroSDHC® connector.

Advantageously, the portable electronic device may comprise a communication interface distinct from said connector, and said communication interface may be capable of communicating through a contactless channel, a vocal channel or a visual channel.

Advantageously, the connector may comprise a second additional pad. Said first additional pad may be dedicated to SWP slave mode and said second additional pad may be dedicated to SWP master mode.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any types of SD® card. An advantage of the invention is to provide a SD® device with extended communication capabilities and a remaining free connector pad.

Another advantage of the invention is to increase the number of communication channels available for a SD® device.

An additional advantage of the invention is to provide a solution allowing keeping the SD® device compliant with current standards of the Secure Digital® domain.

A microSD® connector must have at least height pads. Such a connector may have two additional pads intended to be connected to an antenna in conformity with standard upgrade microSD® Card Addendum Version 2.00 to Physical Layer Specifications.

The SWP protocol is a full duplex protocol which requires only one wire. The NFC standard is a contactless communication standard. NFC stands for Near Field Communication. The SWP protocol has been developed for the communication between a smart card and a NFC circuit. The SWP protocol is defined in ETSI standard, in particular in the ETSI TS 102 613 v7.1.0 (2008-02).

Figure 1:
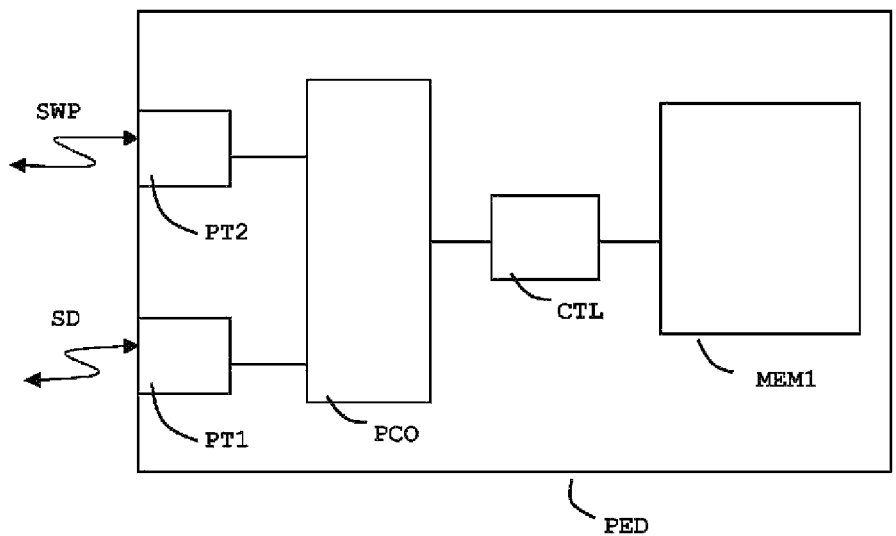
FIG. 1 depicts schematically an example of a first embodiment of a portable electronic device according to the invention.

FIG. 1 shows the architecture of a portable electronic device PED according to a first embodiment of the invention.

The portable electronic device PED comprises two ports PT1 and PT2. The port PT1 is intended to communicate by using the Secure Digital® protocol. The port PT2 is intended to communicate by using the SWP protocol. The portable electronic device PED comprises a controller PCO linked to the two ports PT1 and PT2. The controller PCO is able to treat data coming from and going to the port PT1 through the Secure Digital® protocol. The controller PCO is able to treat data coming from and going to the port PT2 through the SWP protocol. The portable electronic device PED comprises a memory controller CTL linked to the controller PCO. Advantageously data may be exchanged between the controller PCO and the memory controller CTL by using the Secure Digital® protocol. The portable electronic device PED comprises a memory MEM1 linked to the memory controller CTL. The memory MEM1 is a non volatile memory. In a preferred embodiment the memory MEM1 is of flash type.

The portable electronic device PED is intended to be connected to a host machine having a MicroSD® connector.

In the above described example the memory controller CTL and the controller PCO are shown as two distinct elements having each one a specific function. These two elements may be merged in one or several circuits. The present invention may be implemented with any combinations of one or several circuits providing the two functions.

Alternatively, the controller PCO is able to treat data coming from and going to the port PT2 through a protocol suited for an antenna.

Figure 2:
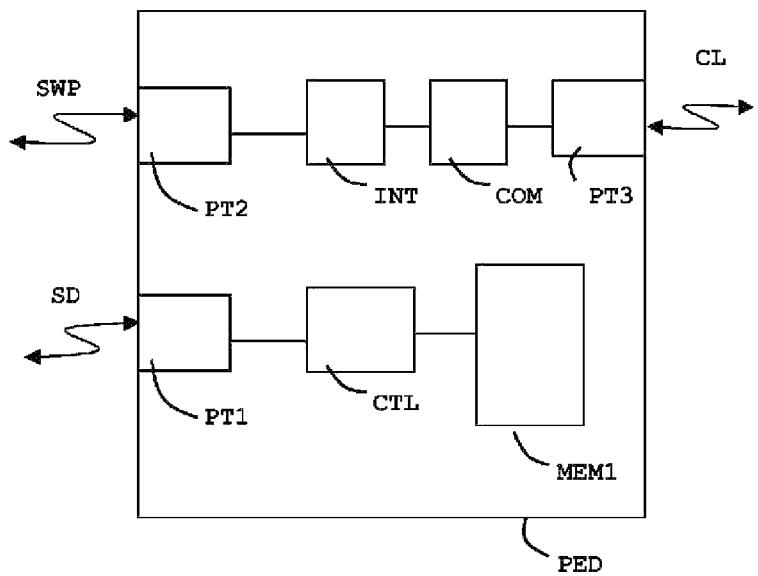
FIG. 2 depicts schematically an example of a second embodiment of a portable electronic device with a contactless interface according to the invention.

FIG. 2 shows the architecture of a portable electronic device PED according to a second embodiment of the invention.

The portable electronic device PED comprises three ports PT1, PT2 and PT3. The port PT1 is intended to communicate by using the Secure Digital® protocol. The port PT2 is intended to communicate by using the SWP protocol. The port PT3 is intended to communicate by using a contactless protocol. The port PT3 is distinct from the port PT2. The portable electronic device PED comprises a memory MEM1 and a SD® controller CTL linked to the port PT1. The SD® controller CTL is able to treat data coming from and going to the port PT1 through the Secure Digital® protocol. The SD® controller CTL is able to manage data intended to be stored in the memory MEM1. The portable electronic device PED comprises an interface controller INT linked to the port PT2. The interface controller INT is able to treat data coming from and going to the port PT2 through a single wire protocol of SWP type. The portable electronic device CSD comprises a communication controller COM linked to the port PT3 and to the interface controller INT. The communication controller COM is able to treat data coming from and going to the port PT3 through a contactless protocol. For example, the contactless protocol may comply with infrared, Bluetooth, Zigbee, Wi-fi, USB Wireless, or NFC standards. In particular, the Infrared standard may be compliant with IrDA Data Specification from the Infrared Data Association.

The controller COM could be another way to receive and send information from outside like Microphone, bare code for example.

In a preferred embodiment of the portable electronic device PED of FIG. 2, the memory MEM1 is a large non volatile memory of flash type.

Alternatively, the portable electronic device PED may comprise a memory MEM1 having a very small size. For example, the memory MEM1 may be of EEPROM type.

In the above described example the SD® controller CTL, the communication controller COM and the interface controller INT are shown as three distinct elements having each one a specific function. These three elements may be merged in one or several circuits. The present invention may be implemented with any combinations of one or several circuits providing the three functions.

In specific cases, the present invention may apply to SD® device strongly reduced with almost no memory and reduce protocol means to ensure minimum compliance with the SD® standard.

Figure 3:
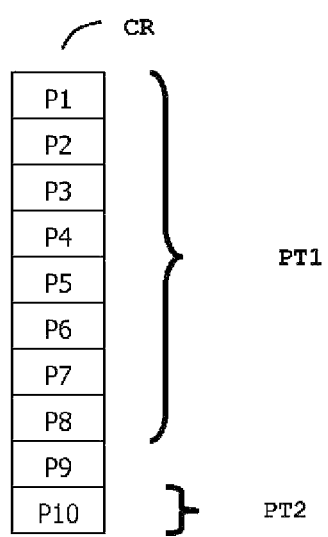
FIG. 3 depicts schematically an example of a connector of a portable electronic device according to the invention.

FIG. 3 shows the connector CR of a portable electronic device PED according to the invention. The eight pads P1 to P8 correspond to the port PT1. The pad P10 corresponds to the port PT2. Alternatively, the pad P9 may correspond to the port PT2 instead of pad P10.

Advantageously, the two extra pads P9 and P10 may be specialized. One of the two extra pads may be dedicated to SWP master and the other one may be dedicated to SWP slave. The pad dedicated to SWP master is used when a direct SWP link is established between a SD® device and another device which has a slave SWP interface like a Smart Card for example. The pad dedicated to SWP slave is used when there is a SWP host system which has the capability to route SWP messages between devices. In particular SWP messages may be routed thanks to the Host controller Interface features defined by the NFC Forum. The Host controller Interface is also named HCI.

The invention claimed is:

1. A portable electronic device configured to be connected to a host machine, said portable electronic device comprising a non-volatile memory, a memory controller and a connector, said connector comprising eight pads for communications using a protocol of Secure Digital® type,
   wherein said connector comprises two additional pads configured to be connected to an antenna for use in a radio frequency communication,
   wherein said portable electronic device comprises an interface controller configured to manage a communication session according to a protocol of SWP type, said portable electronic device comprising a communication controller and a communication interface distinct from said connector, said communication interface being able to communicate through a wireless channel, said communication controller being configured to treat data exchanged through the communication interface, said communication controller being linked to both the communication interface and the interface controller, and
   wherein the interface controller is linked to the two additional pads, one of the additional pads being dedicated to SWP master mode and the other additional pad being dedicated to SWP slave mode.

2. A portable electronic device according to claim 1, wherein said connector is a MicroSD® connector or a MicroSDHC® connector.

* * * * *